United States Patent [19]
Pfaff, Jr.

[11] Patent Number: 5,842,399
[45] Date of Patent: Dec. 1, 1998

[54] JOURNAL-LESS ROTARY DIES AND STAND

[75] Inventor: Alan R. Pfaff, Jr., Orchard Lake, Mich.

[73] Assignee: Atlantic Eagle, Inc., Farmington Hills, Mich.

[21] Appl. No.: 192,067

[22] Filed: Feb. 3, 1994

Related U.S. Application Data

[63] Continuation of Ser. No. 2,660, Jan. 11, 1993, abandoned.

[51] Int. Cl.⁶ ........................................................ B26D 1/62
[52] U.S. Cl. .......................... 83/343; 83/345; 83/698.41; 83/698.61
[58] Field of Search ............................. 83/343, 344, 345, 83/346, 347, 348, 481, 698.41, 698.61

[56] References Cited

U.S. PATENT DOCUMENTS

| | | | |
|---|---|---|---|
| 4,597,317 | 7/1986 | Heyden | 83/346 |
| 4,608,895 | 9/1986 | Bell et al. | 83/345 |
| 4,759,247 | 7/1988 | Bell et al. | 83/346 |
| 4,770,078 | 9/1988 | Gautier | 83/344 |
| 4,793,229 | 12/1988 | Kleber | 83/344 |
| 5,001,950 | 3/1991 | Fokos et al. | 83/37 |
| 5,058,472 | 10/1991 | Kakko-Chiloff | 83/344 |
| 5,067,380 | 11/1991 | Seefeldt | 83/505 X |
| 5,083,488 | 1/1992 | Stanley et al. | 83/344 |

FOREIGN PATENT DOCUMENTS

| | | |
|---|---|---|
| A-0234559 | 2/1987 | European Pat. Off. . |
| A-0225662 | 6/1987 | European Pat. Off. . |
| A-326931 | 1/1958 | Switzerland . |

*Primary Examiner*—Eugenia A. Jones
*Attorney, Agent, or Firm*—Barnes, Kisselle, Raisch, Chaote, Whittemore & Hulbert, P.C.

[57] ABSTRACT

A pair of rotary die cylinders each removably mountable in a die stand by a pair of opposed arbor assemblies each with a separate spindle journaled in a separate carrier block and having a nose drawable into engagement with complementary recesses in opposed ends of the die cylinder in coaxial alignment with the axis of the die cylinder. The noses of the spindles are removably engaged in the recess by a drawbar extending through each cylinder. The carrier blocks are removably slidably received in slots in a pair of spaced apart uprights of the die stand.

24 Claims, 5 Drawing Sheets

JOURNAL-LESS ROTARY DIES AND STAND

This is a continuation of application Ser. No. 08/002,660 filed on Jan. 11, 1993, now abandoned.

FIELD OF THE INVENTION

This invention relates to rotary cutting dies and more particularly to rotary dies without journals and a stand for mounting them for rotation.

BACKGROUND OF THE INVENTION

For many years a pair of superimposed rotary dies with blades on one or both cylinders have been used to cut blanks from a thin web of material passing through the nip of the dies. Each die is a cylinder with a pair of integral coaxial mounting shafts projecting from its opposed ends. Typically each shaft is journaled in a separate bearing block which is slidably received in one of a pair of spaced apart uprights of a die stand in which the dies are mounted in superimposed relation for corotation for the blades to cut blanks from the web. Drive gears are also mounted on one of the shafts of both dies for corotating them in unison.

These rotary dies are used in high speed mass production machines. Therefore, to minimize down time when changing dies for a different production run, usually the entire die stand with the dies therein is removed from the production machine and another die stand with different dies already therein is installed in the machine. After removal the dies are disassembled from the stand and the bearing blocks and gears are removed from the dies so that they can all be reassembled with other dies for use in the production machine. Frequently the bearings seize or jam on the shafts of the dies and cannot be removed without destroying them. Therefore, usually the bearing blocks are left mounted on the shafts for the life of the dies which increases the cost of an already expensive rotary die assembly.

Alternatively, the dies can be changed while the die stand is still in the production machine which further increases the down time and hence the cost of lost production when changing dies for a different run.

SUMMARY OF THE INVENTION

A pair of rotary die cylinders each removably mountable in a die stand by a pair of opposed arbor assemblies each with a spindle journaled in a separate carrier block and drawn into engagement with recesses in opposed ends of the die cylinder in coaxial alignment therewith preferably by a draw bar extending through the cylinder. Preferably, the blocks are removably and slidably received and supported in guideways in a pair of spaced apart uprights of the die stand.

Preferably a pair of drive gears are mounted on one arbor assembly of each die cylinder for corotating the die cylinders. To facilitate adjustment of the operating relationship of the cutting blades on the cylinders, preferably a phase adjuster mechanism is associated with a spindle of an arbor of one cylinder and an axial adjustment mechanism is associated with a spindle of an arbor of the other cylinder.

Objects, features and advantages of this invention include providing cutting die cylinders without journal shafts thereon, eliminating changing of driving gears and bearing blocks with each change of die cylinders, decreasing the cost of and time required to make a die cylinder, simplifying and reducing the time and cost of changing die cylinders in a stand, decreasing the number of bearing blocks and die stands normally required for mass production operations, and providing die cylinders and stands which are rugged, durable, require relatively little service, maintenance and adjustment in use, and are of relatively simple design and economical manufacture, assembly and installation.

BRIEF DESCRIPTION OF THE DRAWINGS

These and other objects, features and advantages of this invention will be apparent from the appended claims, detailed description and accompanying drawings in which:

DETAILED DESCRIPTION

Figure 1:
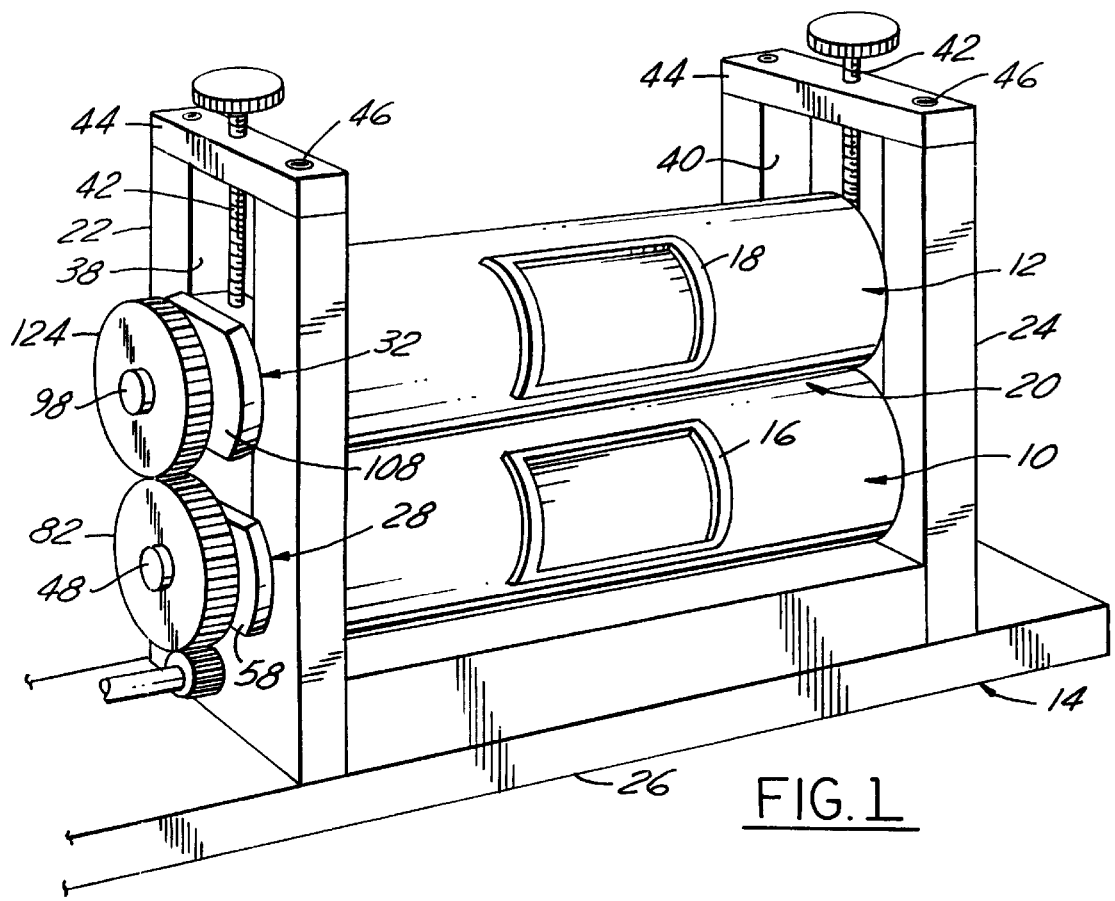
FIG. 1 is a somewhat schematic perspective view of a pair of cutting die cylinders without journal shafts received in a die stand and embodying this invention.
Figure 2:
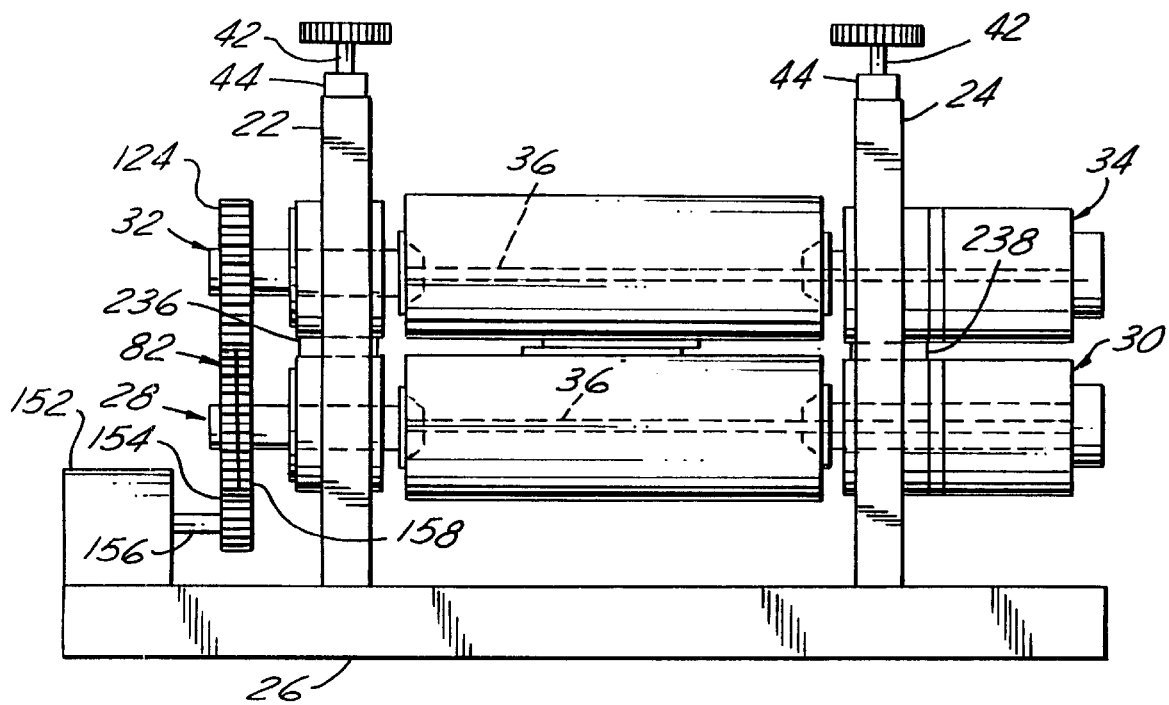
FIG. 2 is a side view of the die cylinders and stand of FIG. 1.
Figure 3:
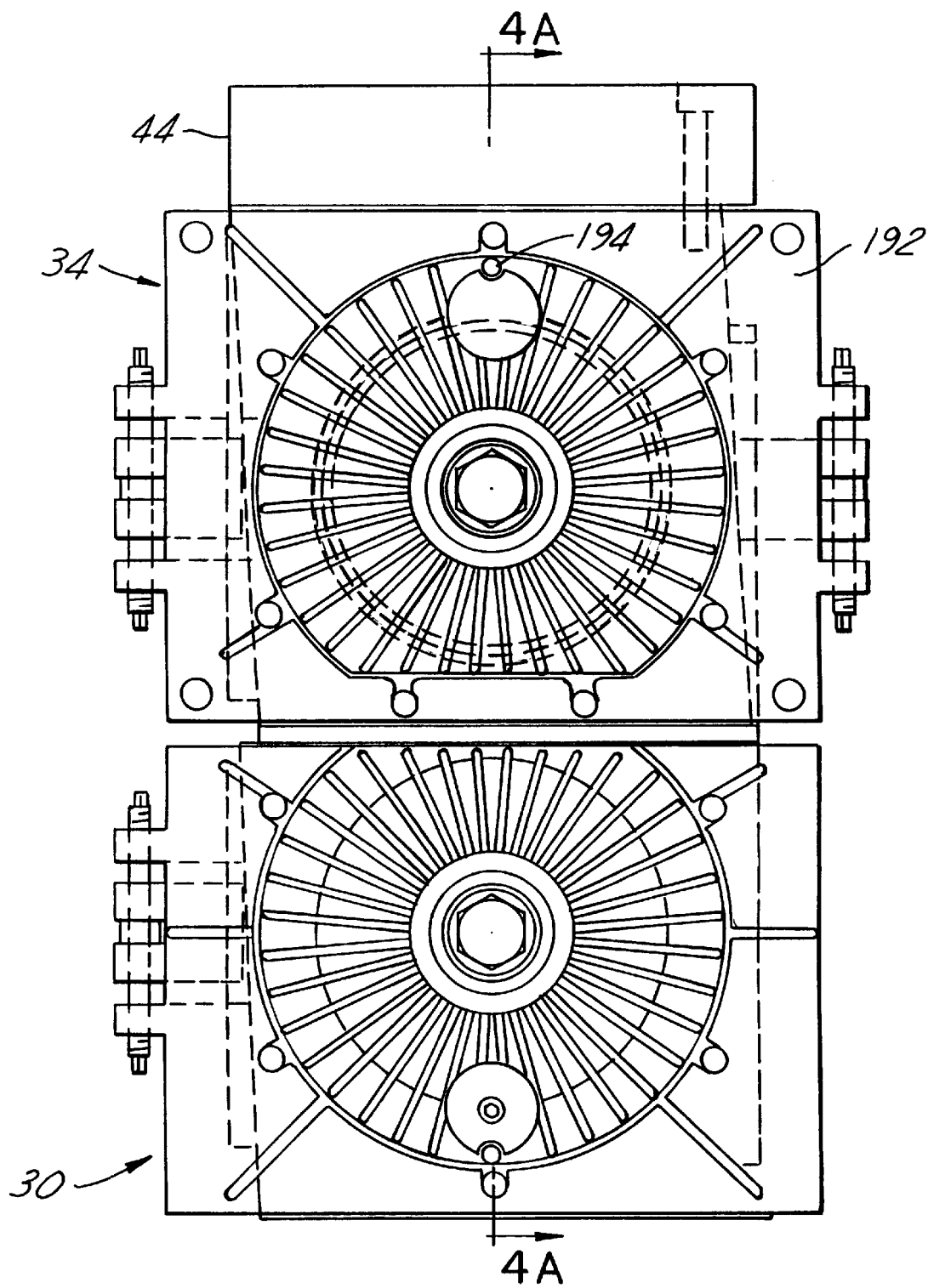
FIG. 3 is fragmentary side view of the cylinders and stand of FIG. 1 illustrating the arbor assemblies on the non-drive or operator side of the stand.

Referring in more detail to the drawings, FIGS. 1 & 2 illustrate a pair of cutting die cylinders 10 & 12 embodying this invention received in a die stand 14. When corotating, cutting blades 16 & 18 on one or both cylinders cut blanks or workpieces and usually some associated scrap pieces from a web of thin material (not shown) passing through the nip 20 of the die cylinders. For carrying the cylinders, the die stand has a pair of spaced apart uprights 22 & 24 fixed to a base 26.

In accordance with this invention, each die cylinder is journaled for rotation by a pair of arbor assemblies 28, 30 & 32, 34 removably connected to an associated cylinder by a draw bar 36 and removably received in guideways or slots 38 & 40 in the uprights of the stand. The arbors are releasably clamped in the stand by threaded screws 42 carried by cross bars 44 secured by cap screws 46 to the tops of the uprights.

The lower cylinder 10 is driven through the arbor assembly 28 which has a spindle 48 (FIG. 4A) journaled for rotation by a preferably cylindrical roller bearing 50 received in a bore 52 through a mounting block 54. Preferably, the block is generally rectangular with parallel side edges 56 slidably received in the slot 38 of the upright. To align and slidably retain the block in the slot, a pair of flange plates 58 & 60 overlap the sides of the upright and are secured by cap screws 62 to the block. To support the cylinder 10 and co-axially align the spindle 48 with it, the spindle has a frusto-conical nose portion 64 slidably receivable in a recess 66 with a complementary frusto-conical side wall 68 in the cylinder. To insure that the spindle rotates in unison with the cylinder, they have complementary axially extending grooves 70 & 72 in which a key 74 is received and preferably secured to the spindle by a cap screw 76. The spindle 28 is drawn into firm engagement with the recess 66 in the cylinder 10 by the draw bar 36 which has a threaded end portion 78 removably receivable in a complementary threaded blind bore 80 in the nose end of the spindle.

To drive the spindle, a gear 82 is received on a spindle journal 84 adjacent its other end, releasably connected for rotation therewith by a key 86 received in complementary keyways and removably retained thereon by a nut 88 threaded on the spindle. The inner race 90 of the bearing 50 is also received on a tapered portion 92 of the spindle and retained thereon by the cooperation of a spacer ring 94 and the gear 82 and nut 88. The outer race 96 of the bearing 50 is slidably received in the cylindrical bore 52 of the block 54 for generally axial movement to permit axial adjustment of the position of the die cylinder 10 as described hereinafter.

The upper cylinder 12 is driven through the arbor assembly 32 which has a spindle 98 journaled for rotation by a preferably anti-backlash roller bearing 100 received in a bore 102 through a mounting block 104. The mounting block is preferably rectangular and has a pair of parallel side edges 106 slidably received in the slot 38 in the upright 22. To slidably retain the block in the upright, preferably a pair of flange plates 108 & 110 overlap the sides of the upright and are secured to the block by cap screws (not shown). The spindle 98 is co-axially aligned with and supports the upper cylinder 12 by the cooperation of a frusto-conical nose portion 112 which is received in a recess 114 with a complementary frusto-conical side wall 116 in the cylinder. In assembly, to insure that the spindle and cylinder rotate in unison, a key 118 is slidably received in complementary axially extending grooves 120 & 122 in the cylinder and spindle and preferably secured by a cap screw (not shown) to the spindle. The spindle is releasably drawn into mating engagement with the cylinder by cooperation with the draw bar 36 which has a threaded end portion 78 received in a complementary threaded bore 80 in the end of the spindle.

The spindle 32 and cylinder 12 are driven in unison through a gear 124 carried by a collar 126 slidably received on a journal 128 of the spindle and coupled for rotation therewith by a key 130 received in complementary axially extending keyways 132 & 134 and releasably retained thereon by a nut 136 threaded on the spindle. The inner race 138 of the bearing 100 is received on a tapered portion 140 of the spindle and retained thereon by the cooperation of a spacer ring 142 and the collar 126 and nut 136. The outer race 144 is entrapped between shoulders on the flange plates.

To permit adjustment of the phase or timed angular rotary relationship of the die cylinders, the gear 124 is journaled for rotation on the collar 126 and is releasably secured to it by circumferentially spaced cap screws 146 received in arcuate slots 148 through the flange of the collar and threaded into the gear 124. Preferably, the heads of the cap screws bear on a wear plate 150.

In assembly, the cylinders 10 & 12 are driven by an electric motor 152 with a pinion gear 154 on its output shaft 156 which meshes with the driven gear 82. Any backlash between the driven gears 82 & 124 is eliminated by an anti-backlash gear ring 158 (FIG. 4A) received for co-axial rotation on a shoulder 160 of the lower gear 82 and meshing with the teeth of the upper gear 124. To eliminate backlash, the gear ring 158 is rotated relative to the lower gear 82 so that their generally axially aligned teeth bear on adjacent teeth of the gear 124 and then releasably clamped in position by circumferentially spaced cap screws 162 received in arcuately elongnate slots 164 in the gear 82 and threaded into the ring gear 158.

Figure 4A:
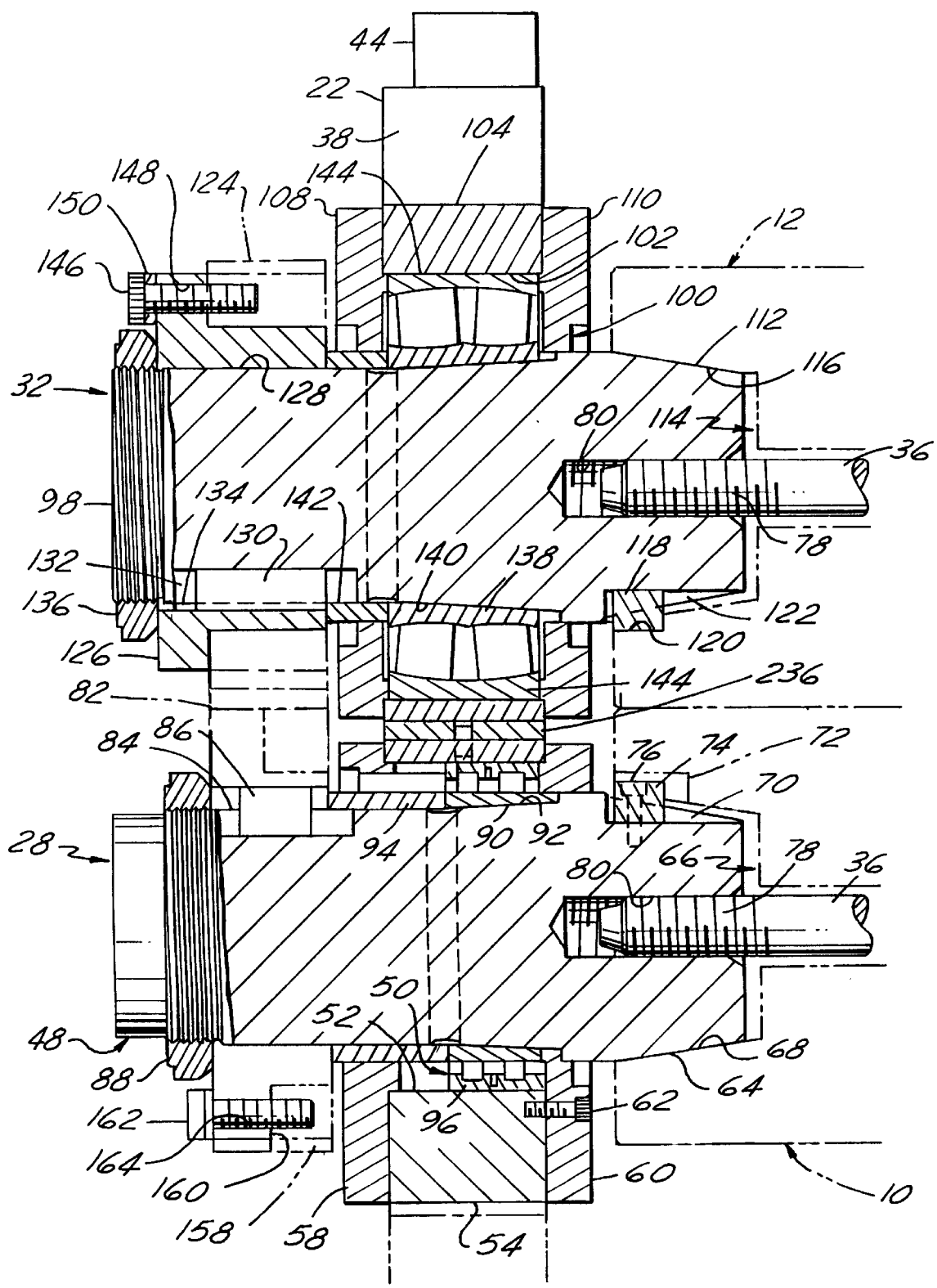
FIG. 4A & 4B taken together is a broken section taken on line 4—4 of FIG. 3 and illustrating the arbor assemblies, die cylinders and draw bars in assembled relationship in the die stand.
Figure 4B:
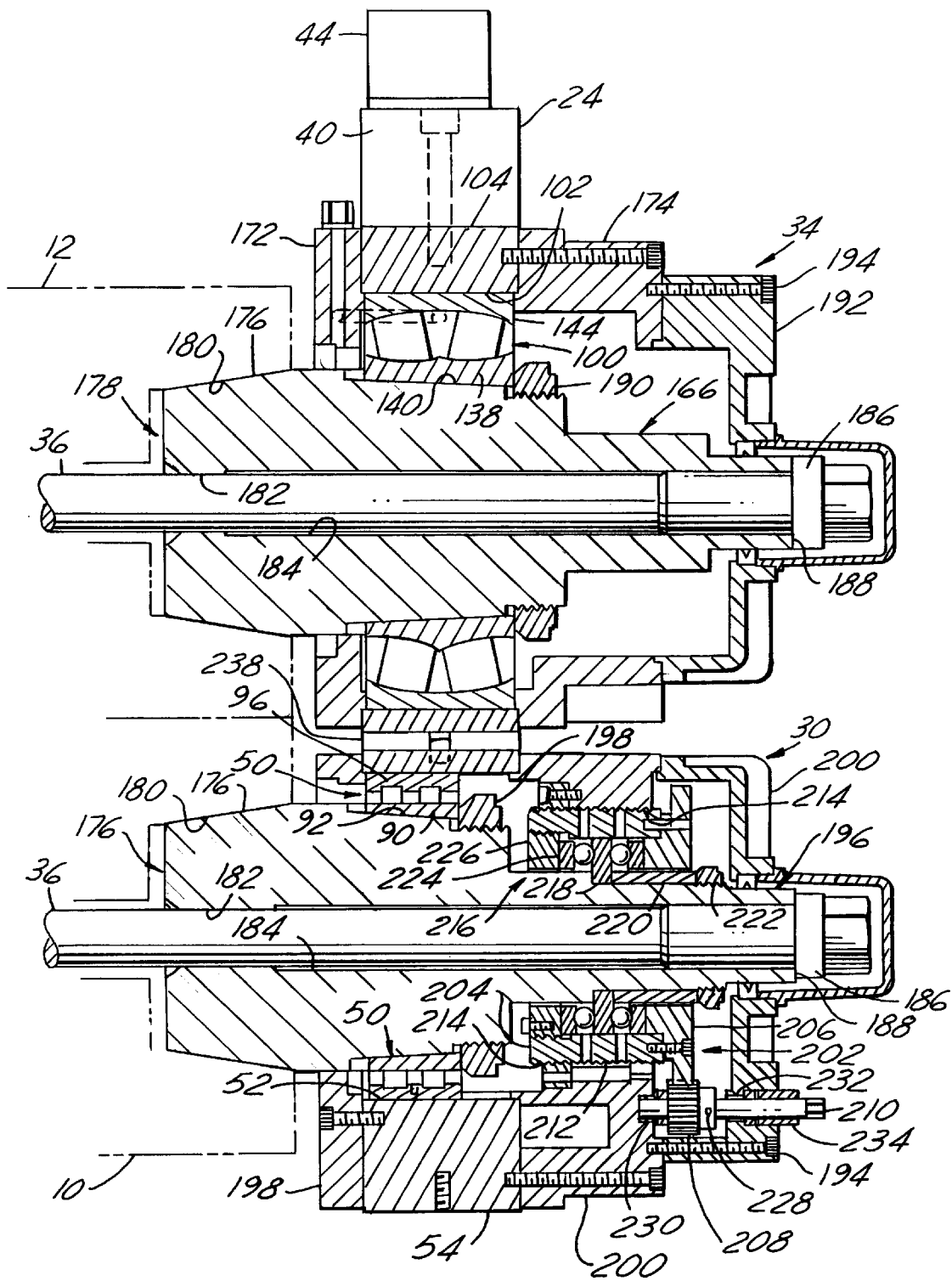

As shown in FIG. 4B, the other end of the upper cylinder 12 is supported and carried by the arbor assembly 34 which has a spindle 166 journaled for rotation by preferably a roller bearing 100 received in a bore 102 through a carrier block 104. The carrier block is preferably rectangular and has a pair of parallel side walls 106 slidably received in the slot 40 in the upright 24. The block is slidably retained in the slot by a pair of flange plates 172 & 174 which overlap the sides of the upright and are secured to the block by cap screws (not shown). To co-axially align and support the cylinder 12, the spindle 166 has a frusto-conical nose portion 176 receivable in a recess 178 with a complementary frusto-conical side wall 180 in the cylinder.

The spindles of both arbor assemblies 32 & 34 are drawn into firm co-axial and supporting engagement with the cylinder 12 by the tie rod 36 which extends through an axial bore 182 and counterbore 184 through the spindle and has a head 186 which bears on an outboard end face 188 of the spindle. The inner race 138 of the bearing 100 is received on a tapered portion 140 of the spindle and retained thereon by a nut 190 threaded on the spindle. The outer race 144 is received in the bore 102 of the block and entrapped between shoulders of the flange plates 172 & 174. Preferably, the spindle and bearing are enclosed by a cover 192 removably secured on the outer flange plate 174 by cap screws 194.

As shown in FIG. 4B, the other end of the lower cylinder 10 is supported and caried by the arbor assembly 30 which has a spindle 196 journaled for rotation preferably by a cylindrical roller bearing 50 slidably received in a bore 52 through a carrier block 54. The carrier block is preferably generally rectangular and has a pair of parallel side edges 56 slidably received in the slot 40 in the upright 24. The block is slidably retained in the slot by a pair of flange plates 198 & 200 which overlap the sides of the upright and are secured to the block by cap screws. To co-axially align and support the cylinder, the spindle 196 has a frusto-conical nose portion 176 receivable in a recess 178 with a complementary frusto-conical side wall 180 in the cylinder 10.

The spindles of both arbor assemblies 28 & 30 are drawn into firm co-axial and supporting engagement with the lower cylinder 10 by the tie rod 36, which extends through an axial bore 182 and counterbore 184 through the spindle and has a head 186 which bears on an outboard end face 188 of the spindle. The inner race 90 of the bearing 50 is received on a tapered portion 92 of the spindle and retained thereon by a nut 198 threaded on the spindle. The outer race 96 is slidably received in the bore 52 of the block 54 for axial movement with the spindle and die cylinder as described hereinafter. The spindle and bearing are enclosed by a cover 200 secured to the outer flange plate by cap screws 194.

To facilitate alignment of cooperating cutting blades 16 & 18 on both cylinders 10 & 12, the lower cylinder 10 can be axially shifted within predetermined limits by an adjustment mechanism 202. The spindle 196 is moved axially by a threaded ring 204 carrying a ring gear 206 driven by a pinion gear 208 which is rotated by manually turning a drive shaft 210. The threaded periphery 212 of the ring 204 is received in complementarily threaded annular retainers 214 in the outboard flange 200. The spindle 196 is operably connected with the carrier ring 204 by a thrust bearing 216 with an inner race 218 secured to the spindle by a spacer sleeve 220 and a threaded nut 222. The outer races 224 are received in the carrier ring and entrapped between a threaded retainer ring 226 and the ring gear 206. The pinion gear 208 meshes with the ring gear 206 and is received on and secured to the drive shaft 210 by a cross pin 228 for rotation therewith. The drive shaft is journaled for rotation by bushings 230 & 232 received in the outer flange 230 and the cover 194. To prevent contamination, the shaft is received in a seal 234.

In operation of the adjustment mechanism 202, the lower cylinder 10, spindles 48 & 196 and both bearings 50 are axially advanced and retracted in unison by manually rotating the drive shaft 210 in opposite directions. Turning the drive shaft rotates the pinion which rotates the ring gear 206 and threaded ring 204 in unison which advances or retracts them in unison with the spindles and bearings due to the threaded engagement of the ring 204 with the retainers 214.

Figure 5:
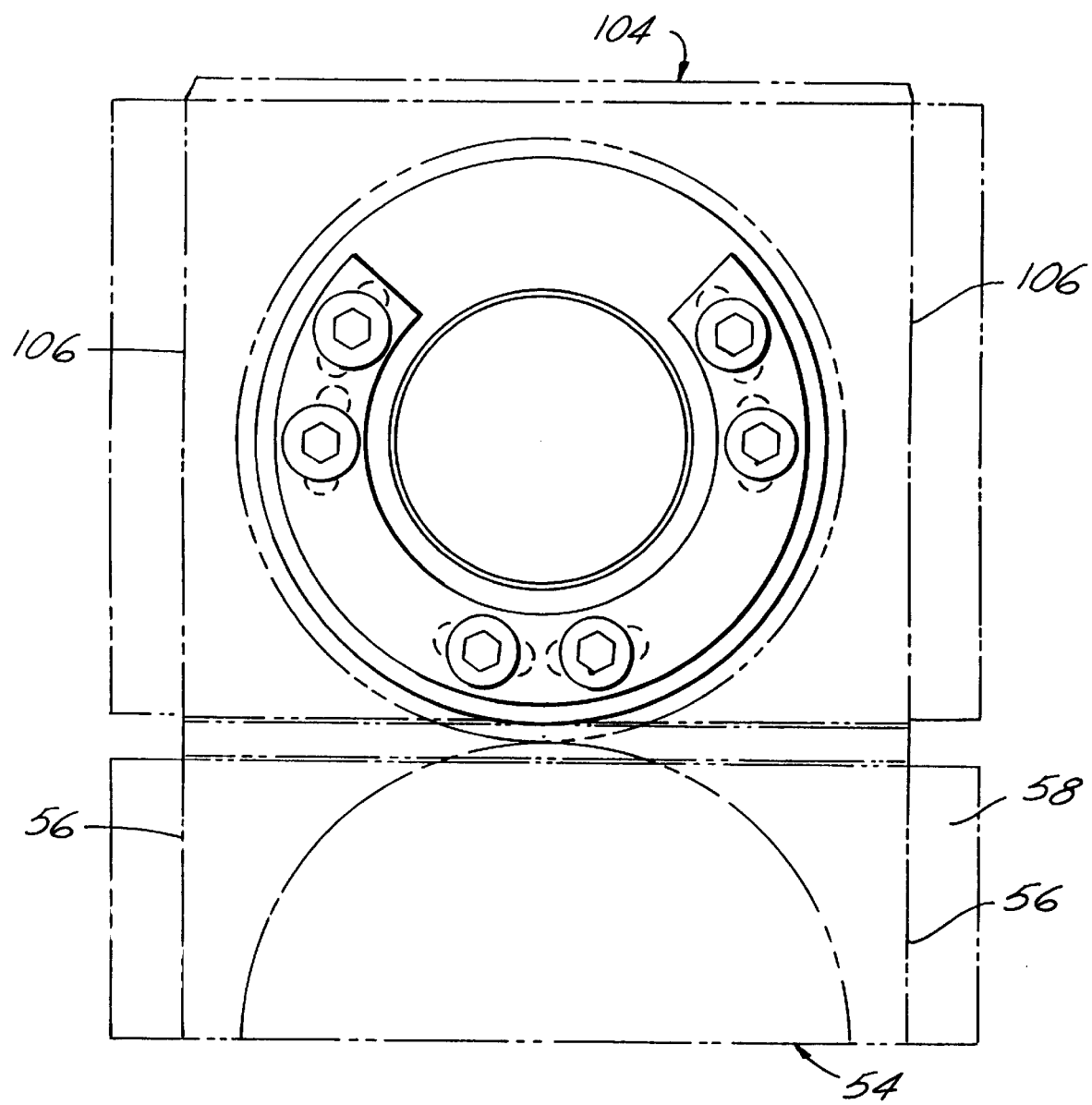
FIG. 5 is a fragmentary side view of the cylinders and stand of FIG. 1 illustrating the upper arbor assembly with a phase adjustment mechanism on the drive side of the stand.

If only one of the die cylinders has cutting blades thereon, and the other cylinder is a plain cylindrical anvil, then usually only an axial adjustment mechanism 202 need be provided for the cylinders. However, if both cylinders have cooperating cutting blades 16 & 18 thereon, usually they need to be adjusted both axially and in phase or relative angular rotary relationship. As shown in FIGS. 4A & 5, an angular phase adjustment mechanism may be provided on one of driven arbors such as the arbor 32 for the upper cylinder 12.

A pair of cylinders 10 & 12 may be installed in the die stand 14 by first sub-assembling the arbors and draw bars together on both die cylinders so that the noses of the spindles are secured in the complementary recesses of the cylinders. If desired, the driven gears 82 & 124 may also be assembled on the spindles of the arbors 28 & 32.

The clamp screws 42 and carrier bars 44 are removed from the uprights 22 & 24 of the stand and the lower cylinder 10 with the arbors 28 & 30 thereon is disposed above the slots 38 & 40 and lowered so that the blocks 54 of the associated arbors are slidably received in the slots of the stand. The cylinder 10 is fully lowered into the stand with the associated blocks received in the bottom of the slots. Normally, a pair of spacer blocks or shims 236 & 238 are disposed on the exposed upper face of the blocks over the locator pins therein. The upper cylinder 12 with the arbors 32 & 34 thereon is then disposed over the die stand and lowered so that its associated arbor blocks 104 are slidably received in the slots 38 & 40 in the uprights of the stand. The upper cylinder is fully lowered so that the lower faces of its associated arbor blocks bear on the upper faces of the space shims 236 & 238. The spacer shims determine the gap between complementary cutting blades 16 & 18 on both die cylinders or cutting blades on one die cylinder and a cylindrical anvil surface on the other die cylinder. Therefore, shims of differing thickness may be used as needed to provide the desired spacing. Then the carrier bars 44 for the clamp screws 42 are disposed on the tops of the uprights 38 & 40 and secured thereto by cap screws. The clamp screws 42 are then manually adjusted to apply the desired clamping force to the arbor blocks by turning the screws so that they bear on the upper faces of the arbor blocks 104 of the upper cylinder 12 with the desired force.

To change a pair of die cylinders, the same procedure is generally followed in the reverse order to remove cylinders with the arbors thereon from the die stand and thereafter another set of cylinders are installed in the stand by the procedure outlined above. Therefore, pairs of similar replacement die cylinders can be easily and rapidly changed and installed in a die stand 14 in a production machine without removing the stand, without removing the driven gears, and without disassembling the axial and phase adjusting mechanisms.

If an even faster cylindrical die changeover time is desired, it can be achieved by providing and using one extra set of arbors 28, 30, 32 & 34 and driven gears. So long as only one set of dies is changed at a time, the extra set of arbors and driven gears can be used with many different sets of die cylinders and die stands.

In operation, the die cylinders 10 & 12 are driven by the motor 152 to corotate in opposite directions of rotation, such as counter-clockwise and clockwise, at substantially the same peripheral surface speed. As a web of thin material passes through the nip 20 of the die cylinders, pieces are cut from the web by the cutting blades. If both cylinders have complementary cutting blades 16 & 18 thereon, the material is cut between the blades. If only one of the cylinders has cutting blades, and the other is a plain cylindrical anvil cylinder, the material is cut by being pinched between the blade and the anvil peripheral surface of the cylinder. Normally, the cut pieces are separated and removed from the web downstream from the nip 20.

I claim:

1. An apparatus comprising a pair of die cylinders each having a pair of opposed ends and an axis of rotation, each die cylinder having a recess in each of its opposed ends, each said recess having a sidewall tapering inwardly relative to its associated end, the sidewalls of the recesses of each cylinder being essentially coaxial with each other and the axis of rotation of their associated cylinder, a pair of arbor assemblies for each die cylinder, each said arbor assembly having a carrier block and a spindle journaled for rotation in said carrier block and having a nose removably receivable in one of said recesses of an associated die cylinder, said nose having a tapered peripheral sidewall for complementary mating engagement with the sidewall of the recess of the associated die cylinder and being essentially coaxial with the axis of rotation of its spindle, the axes of rotation of the spindles of each pair of said arbor assemblies being coaxial and their noses being in opposed spaced apart relationship, securing means for each pair of arbor assemblies releasably urging the noses of the spindles thereof into the recesses of one of the die cylinders with the tapered peripheral sidewalls of the noses in mating engagement with the sidewalls of the recesses to coaxially align the axis of the die cylinder with the axis of rotation of the spindles for rotation in unison, each carrier block being constructed and arranged to be removably and slidably receivable between a pair of spaced apart and generally parallel guideways in a die stand in conjunction with its associated cylinder and without disassembling its associated arbor assembly from the die cylinder, and each die cylinder and its associated pair of arbor assemblies being separately slidably removable from the guideways of the die stand without disassembling the arbor assemblies from their associated die cylinder.

2. The apparatus of claim 1 wherein the tapered sidewall of said nose of each spindle has a frusto-conical surface, each sidewall of each recess has a complementary frusto-conical surface and in assembly the frusto-conical surfaces of each nose and its associated recess mate to coaxially align their associated spindle and die cylinder.

3. The apparatus of claim 2 which also comprises for each cylinder complementary keyways in one of its recesses and the associated nose of the spindle of its associated arbor assembly and a key received in said complementary keyways to prevent relative rotation between the cylinder and spindle of its associated arbor assembly.

4. The apparatus of claim 2 wherein the securing means for at least one pair of arbor assemblies comprises a drawbar extending generally axially through one spindle of the pair of arbor assemblies and its associated die cylinder and removably engaging the other spindle of the pair of arbor assemblies.

5. The apparatus of claim 4 wherein both the spindles of the pair of arbor assemblies associated with one die cylinder are each axially reciprocable within limits relative to their associated carrier blocks and which also comprises an adjustment mechanism carried by the last mentioned pair of arbor assemblies for moving axially in unison the last mentioned spindles and the one die cylinder relative to their associated carrier blocks.

6. The apparatus of claim 2 wherein both the spindles of the pair of arbor assemblies associated with one die cylinder are each axially reciprocable within limits relative to their associated carrier blocks and which also comprises an adjustment mechanism carried by the last mentioned pair of arbor assemblies for moving axially in unison the last mentioned spindles and the one die cylinder relative to their associated carrier blocks.

7. The apparatus of claim 1 which also comprises for each cylinder complementary keyways in one of its recesses and the associated nose of the spindle of its associated arbor assembly and a key received in said complementary keyways to prevent relative rotation between the cylinder and spindle of its associated arbor assembly.

8. The apparatus of claim 1 which also comprises a first journal on one spindle associated with one of said cylinders and constructed and arranged to receive a first gear thereon for rotation in unison therewith, and a second journal on one spindle associated with the other of said cylinders and constructed and arranged to receive a second gear thereon for rotation therewith, whereby a cylinder can be installed in and removed from a die stand without removing either of the first and second gears from their associated spindles, and when both of said die cylinders are installed in the die stand, the first and second gears mesh for corotating said die cylinders.

9. The apparatus of claim 8 which also comprises for each of said cylinders complementary keyways in the nose of its said one spindle and its associated recess in the cylinder and a key received in said complementary keyways to prevent relative rotation between said one spindle and its associated cylinder.

10. The apparatus of claim 8 wherein the securing means for at least one pair of arbor assemblies comprises a drawbar extending generally axially through one spindle of the pair of arbor assemblies and its associated die cylinder and removably engaging the other spindle of the pair of arbor assemblies.

11. The apparatus of claim 8 wherein both the spindles of the pair of arbor assemblies associated with one die cylinder are each axially reciprocable within limits relative to their associated carrier blocks and which also comprises an adjustment mechanism carried by the last mentioned pair of arbor assemblies for moving axially in unison the last mentioned spindles and the one die cylinder relative to their associated carrier blocks.

12. The apparatus of claim 8 which also comprises a phase adjuster mechanism carried by one of said arbor assemblies and having a hub carried by the spindle of said one arbor assembly for rotation in unison therewith, and a coupling associated with said hub and one of said gears and constructed and arranged to permit said one gear to be moved angularly relative to said hub within predetermined limits and releasably connected in an adjusted angular position to said hub for rotation of said one gear in unison with said hub and said spindle of said one arbor assembly.

13. The apparatus of claim 1 wherein both the spindles of the pair of arbor assemblies associated with one die cylinder are each axially reciprocable within limits relative to their associated carrier blocks and which also comprises an adjustment mechanism carried by the last mentioned pair of arbor assemblies for moving axially in unison the last mentioned spindles and the one die cylinder relative to their associated carrier blocks.

14. The apparatus of claim 13 which also comprises a phase adjuster mechanism carried by one of said arbor assemblies and having a hub carried by the spindle of said one arbor assembly for rotation in unison therewith, a gear carried by and rotatable relative to said one spindle carrying said hub, and a coupling associated with said hub and said gear and constructed and arranged to permit said gear to be moved angularly relative to said hub within predetermined limits and releasably connected in an adjusted angular position to said hub for rotation of said gear in unison with said hub and said spindle of said one arbor assembly.

15. The apparatus of claim 14 wherein each arbor assembly also comprises a pair of spaced apart flanges carried by its associated carrier block and, in assembly, portions of said flanges bear on adjacent portions of its associated guideway when said carrier block is received therein to limit generally axial movement of said carrier block relative to its associated guideway.

16. The apparatus of claim 1 which also comprises a phase adjuster mechanism carried by one of said arbor assemblies and having a hub carried by the spindle of said one arbor assembly for rotation in unison therewith, a gear carried by and rotatable relative to said one spindle carrying said hub, and a coupling associated with said hub and said gear and constructed and arranged to permit said gear to be moved angularly relative to said hub within predetermined limits and releasably connected in an adjusted angular position to said hub for rotation of said gear in unison with said hub and spindle of said one arbor assembly.

17. An apparatus comprising a pair of die cylinders each having a pair of opposed ends and an axis of rotation, each die cylinder having a recess in each of its opposed ends, each said recess having a sidewall tapering inwardly relative to its associated end, the sidewalls of the recesses of each cylinder being essentially coaxial with each other and the axis of rotation of their associated cylinder, a pair of arbor assemblies for each die cylinder, each said arbor assembly having a carrier block and a spindle journaled for rotation in said carrier block and having a nose removably receivable in one of said recesses of an associated die cylinder, said nose having a tapered peripheral sidewall for complementary mating engagement with the sidewall of the recess of the associated die cylinder and being essentially coaxial with the axis of rotation of its spindle, the axes of rotation of the spindles of each pair of said arbor assemblies being coaxial and their noses being in opposed spaced apart relationship, securing means for each pair of arbor assemblies releasably urging the noses of the spindles thereof into the recesses of one of the die cylinders with the tapered peripheral sidewalls of the noses in mating engagement with the sidewalls of the recesses to coaxially align the axis of the die cylinder with the axis of rotation of the spindles for rotation in unison, the securing means for at least one pair of arbor assemblies comprising a drawbar extending generally axially through one spindle of the pair of arbor assemblies and its associated die cylinder and removably engaging the other spindle of the pair of arbor assemblies, and each carrier block being constructed and arranged to be removably and slidably receivable between a pair of spaced apart and generally parallel guideways in a die stand in conjunction with its associated cylinder and without disassembling its associated arbor assembly from the die cylinder.

18. The apparatus of claim 17 wherein the tapered sidewall of said nose of each spindle has a frusto-conical surface, each sidewall of each recess has a complementary frusto-conical surface and in assembly the frusto-conical surfaces of each nose and its associated recess mate to coaxially align their associated spindle and die cylinder.

19. The apparatus of claim 17 which also comprises for each cylinder complementary keyways in one of its recesses and the associated nose of the spindle of its associated arbor assembly and a key received in said complementary keyways to prevent relative rotation between the cylinder and spindle of its associated arbor assembly.

20. The apparatus of claim 17 which also comprises a first journal on one spindle associated with one of said cylinders and constructed and arranged to receive a first gear thereon for rotation in unison therewith, and a second journal on one spindle associated with the other of said cylinders and constructed and arranged to receive a second gear thereon for rotation therewith, whereby a cylinder can be installed in and removed from a die stand without removing either of the first and second gears from their associated spindles, and when both of said die cylinders are installed in the die stand, the first and second gears mesh for corotating said die cylinders.

21. The apparatus of claim 17 wherein both the spindles of the pair of arbor assemblies associated with one die cylinder are each axially reciprocable within limits relative to their associated carrier blocks and which also comprises an adjustment mechanism carried by the last mentioned pair of arbor assemblies for moving axially in unison the last mentioned spindles and the one die cylinder relative to their associated carrier blocks.

22. An apparatus comprising a pair of die cylinders each having a pair of opposed ends and an axis of rotation, each die cylinder having a recess in each of its opposed ends, each said recess having a sidewall tapering inwardly relative to its associated end, the sidewalls of the recesses of each cylinder being essentially coaxial with each other and the axis of rotation of their associated cylinder, a pair of arbor assemblies for each die cylinder, each said arbor assembly having a carrier block and a spindle journaled for rotation in said carrier block and having a nose removably receivable in one of said recesses of an associated die cylinder, said nose having a tapered peripheral sidewall for complementary mating engagement with the sidewall of the recess of the associated die cylinder and essentially coaxial with the axis of rotation of its spindle, the axes of rotation of the spindles of each pair of said arbor assemblies being coaxial and their noses being in spaced apart opposed relationship, securing means for each pair of arbor assemblies releasably urging the noses of the spindles thereof into the recesses of one of the die cylinders with the tapered peripheral sidewalls of the noses in mating engagement with the sidewalls of the recesses to coaxially align the axis of the die cylinder with the axis of rotation of the spindles for rotation in unison, a die stand having a base, a pair of spaced apart and generally parallel guideways constructed and arranged to receive said blocks of said arbor assemblies thereon when assembled with said die cylinders and with said die cylinders being disposed between said spaced apart guideways with their axes extending essentially parallel to each other and permitting each pair of said arbor assemblies to be removed from said guideways and said die stand along with their associated die cylinder and while still in assembled relationship with their associated die cylinder, each carrier block being constructed and arranged to be removably receivable in the die stand in conjunction with its associated die cylinder and without disassembling its associated arbor assembly from the die cylinder and each die cylinder and its associated pair of arbor assemblies being separately removable from the die stand without disassembling the arbor assemblies from their associated die cylinder.

23. The apparatus of claim 22 wherein said die stand comprises a pair of spaced apart uprights carried by said base and said guideways comprise a slot in each of said uprights with said slots extending essentially parallel to each other and generally perpendicular to the axes of rotation of said die cylinders.

24. The apparatus of claim 23 wherein each arbor assembly also comprises a pair of spaced apart flanges carried by its associated carrier block and, in assembly, portions of said flanges bear on adjacent portions of its associated upright adjacent its associated slot when said associated carrier block is received therein to limit generally axial movement of said carrier block relative to its associated upright.

* * * * *